(12) United States Patent
Fahlbusch et al.

(10) Patent No.: US 9,389,388 B2
(45) Date of Patent: Jul. 12, 2016

(54) CONTROLLER FOR ACTUATORS IN MICROSCOPE LENSES

(75) Inventors: Ingo Fahlbusch, Goettingen (DE); Georg Herbst, Goettingen (DE)

(73) Assignee: Carl Zeiss Micromanaging GmbH, Jena (DE)

( * ) Notice: Subject to any disclaimer, the term of this patent is extended or adjusted under 35 U.S.C. 154(b) by 826 days.

(21) Appl. No.: 12/996,246

(22) PCT Filed: May 30, 2009

(86) PCT No.: PCT/EP2009/003893
§ 371 (c)(1),
(2), (4) Date: Dec. 3, 2010

(87) PCT Pub. No.: WO2009/146868
PCT Pub. Date: Dec. 10, 2009

(65) Prior Publication Data
US 2011/0082590 A1   Apr. 7, 2011

(30) Foreign Application Priority Data
Jun. 4, 2008  (DE) .......................... 10 2008 026 774

(51) Int. Cl.
*G02B 7/00* (2006.01)
*G02B 7/02* (2006.01)
(Continued)

(52) U.S. Cl.
CPC ............... *G02B 7/023* (2013.01); *G02B 21/02* (2013.01); *G02B 21/241* (2013.01); *G02B 27/0068* (2013.01)

(58) Field of Classification Search
CPC ............ G02B 7/005; G02B 7/04; G02B 7/08; G02B 7/09; G02B 7/10–7/287; G02B 15/00–15/28; G02B 21/00–21/368

USPC .................. 359/379–380, 382–384, 421–422, 359/425–426, 432, 821, 824–826; 700/275
See application file for complete search history.

(56) References Cited

U.S. PATENT DOCUMENTS 4,161,756 A * 7/1979 Thomas ........................ 359/696
4,329,578 A   5/1982 Rosner
(Continued)

FOREIGN PATENT DOCUMENTS

DE   26 11 639 A1   9/1977
DE   29 25 906 A1   1/1981
(Continued)

OTHER PUBLICATIONS

International Preliminary Report on Patentability for International Application No. PCT/EP2009/003893, dated Sep. 2, 2014, 7 pages.

*Primary Examiner* — Bumsuk Won
*Assistant Examiner* — Jeffrey Madonna
(74) *Attorney, Agent, or Firm* — Patterson Thuente Pederson, P.A.

(57) ABSTRACT

A controller for microscope lenses for correcting spherical aberration and for adjusting particularly difficult to access microscope lenses to an optimum of imaging quality, enabling automatic adjustment of the different actuators of a microscope lens, to effect a simple, cost-effective, user-friendly, and precise balance, particularly of cover slip deviations and different base thicknesses of Petri dishes for the purposes of increasing imaging quality. At least two movable elements of a microscope objective supporting lenses or lens groups, are provided in a movable manner in the axial direction along the optical axis of the microscope objective relative to the housing of the microscope lens in a motor-actuated manner by way of respective adjusting rings. A controller externally controlled and disposed in the microscope lens is provided for storing different characteristic curves for paths of motion of the movable elements.

19 Claims, 2 Drawing Sheets

(51) Int. Cl.
*G02B 21/02* (2006.01)
*G02B 21/24* (2006.01)
*G02B 27/00* (2006.01)

(56) References Cited

U.S. PATENT DOCUMENTS

| | | | | |
|---|---|---|---|---|
| 4,885,600 A * | 12/1989 | Iwasa | ................... | G02B 7/282 |
| | | | | 359/704 |
| 5,140,458 A * | 8/1992 | Takagi et al. | ................. | 359/380 |
| 5,144,491 A | 9/1992 | Ushiro et al. | | |
| 5,825,535 A * | 10/1998 | Biber | ................... | G02B 7/102 |
| | | | | 359/377 |
| 5,856,886 A * | 1/1999 | Kaizu | ................... | G02B 21/02 |
| | | | | 359/821 |
| 5,930,732 A | 7/1999 | Domanik et al. | | |
| 6,023,381 A | 2/2000 | Bender | | |
| 6,366,398 B1 * | 4/2002 | Ouchi | ................. | G02B 21/248 |
| | | | | 359/368 |
| 6,504,656 B1 * | 1/2003 | Winterot et al. | ............. | 359/690 |
| 6,909,540 B2 | 6/2005 | Engelhardt et al. | | |
| 7,230,773 B2 * | 6/2007 | Nomura | ................. | G02B 7/102 |
| | | | | 359/696 |
| 7,271,966 B2 | 9/2007 | Herbst et al. | | |
| 7,327,514 B2 * | 2/2008 | Uhl | ........................ | G02B 21/05 |
| | | | | 359/379 |
| 7,599,615 B2 * | 10/2009 | Hsiao | ................... | G03B 17/04 |
| | | | | 310/80 |
| 7,679,849 B2 * | 3/2010 | Lule | ......................... | G02B 7/08 |
| | | | | 348/345 |
| 8,094,389 B2 * | 1/2012 | Terada | ............... | G01N 21/9501 |
| | | | | 324/756.03 |
| 2002/0001126 A1 * | 1/2002 | Engelhardt | ........ | G02B 21/0072 |
| | | | | 359/380 |
| 2003/0103263 A1 | 6/2003 | Engelhardt et al. | | |
| 2006/0182001 A1 | 8/2006 | Isobe et al. | | |
| 2007/0097495 A1 * | 5/2007 | Knoblich | ............... | G02B 21/26 |
| | | | | 359/384 |
| 2008/0025715 A1 * | 1/2008 | Ishii | ........................ | G02B 7/282 |
| | | | | 396/105 |
| 2008/0266440 A1 * | 10/2008 | Yazdanfar et al. | ............ | 348/340 |
| 2012/0188660 A1 * | 7/2012 | Fahlbusch | .............. | G02B 7/002 |
| | | | | 359/824 |

FOREIGN PATENT DOCUMENTS

| | | |
|---|---|---|
| DE | 690 23 387 T2 | 4/1996 |
| DE | 196 37 398 A1 | 4/1997 |
| DE | 198 04 470 C1 | 8/1999 |
| DE | 198 22 256 A1 | 12/1999 |
| DE | 101 59 239 A1 | 6/2003 |
| DE | 691 33 245 T2 | 1/2004 |
| DE | 103 61 912 A1 | 7/2005 |
| DE | 10 2004 034 992 A1 | 2/2006 |
| DE | 20 2008 006 065 U1 | 8/2008 |
| EP | 1 319 968 A2 | 6/2003 |
| GB | 1 532 576 | 11/1978 |
| JP | 07-333480 | 12/1995 |
| JP | 07-333480 A | 12/1995 |

* cited by examiner

CONTROLLER FOR ACTUATORS IN MICROSCOPE LENSES

PRIORITY CLAIM

The present application is a National Phase entry of PCT Application No. PCT/EP2009/003893, filed May 30, 2009, which claims priority from German Application Number 102008026774.0, filed Jun. 4, 2008, 2008, the disclosures of which are hereby incorporated by reference herein in their entirety.

FIELD OF THE INVENTION

The invention relates to a controller for movable elements in microscope objectives for the adjustment of particularly hard-to-reach microscope objectives for ideal imaging quality and means for storing the adjustment movements of the movable elements.

BACKGROUND

It is known, as described in DE 198 04 470 C1, that for the adjustment to varying cover glass thicknesses, microscope objectives exhibit several lens group mounts, whereby one is designed as a correcting mount for the adjustment to varying cover glass thicknesses and axially movable between the lens group mounts, which are stationary with regard to the objective, whereby the correcting mount supports itself on the curve of a curve ring, arranged within the mount carrier, and which rotates. In order for the correcting mount to execute this shift, a lug, movable around the optical axis by means of a knurled ring in the mount carrier, is arranged at its end perpendicular to the optical axis. It is also known that the rotational movement of the movable elements is converted to a linear movement of the movable elements by means of a curved track. The disadvantage of using curves can be seen in the manufacture of the surfaces of said curves. Therefore, the evenness of the face of the produced curve in microscope objectives with regard to imaging quality of the microscope objective is very important. For achieving a sufficient surface quality, the faces of the curves must be ground in order to assure that no visible disturbances occur during the movement of the movable elements. Even though it is technically possible to grind a groove that is shaped as a curve, it is not applicable for reproducible serial production. A curve control via cam discs is utilized in the area of stereomicroscopy.

Here, the grinding of cam discs for increased surface quality is technically possible since it does not require the use of small grinders as for a groove in microscope objectives. Furthermore, the use of a curve control is advantageous due to the greater allowable tolerances in the area of stereomicroscopy. For the movement of the movable elements, a lever is also partially utilized for moving the movable elements. Even though a quick movement can be achieved via lever adjustment, a continuous movement of several movable elements together, as required in microscope objectives, cannot be achieved. Therefore, the adjustment via a lever is mainly suited for a quick positioning in the end positions.

In DE 101 59 239 A1, a microscope objective with motorized adjustable lenses for mapping of a sample is described. Said microscope objective is characterized in that all lenses together are arranged motorized adjustable within the lens housing, whereby said design serves for adjusting the scanning plane with a microscope objective. From DE 198 22 256 A1, a design for the direct control of the movement of a zoom system within a stereomicroscope is known, which consists of direct motorized drives for at least one movable lens group, whereby this design is a combination of motorized zoom and motorized focus. Furthermore, in DE 103 61 912 A1, a microscope objective with axially adjustable correcting mounts is described, whereby the axial movements of lens groups in a microscope objective for correcting of cover glass fluctuations and/or varying immersion media is provided via threaded rings. Thereby, corrections of the microscope objective are executed manually through the turning of a knurled ring. If the microscope objective is difficult to access, an adjustment for correcting the imaging quality on the microscope objective is very elaborate, i.e., if the observation position in a Petri dish changes, the bottom thickness of the Petri dish also changes. If said fluctuations are to be compensated in order to achieve a sharp high-contrast image, the knurled ring of the microscope objective must be turned. Therefore, for sample examinations with varying cover glass and bottom thicknesses, a microscope user must perform a variety of elaborate adjustments for positioning and attaining a very high imaging quality during the sample examination.

SUMMARY OF THE INVENTION

Based on said prior art, the invention is based on the task of creating a controller for microscope objectives for correcting the spherical aberration and for the adjustment of particularly hard-to-reach microscope objectives for best imaging quality, and which allows for an automatic adjustment of the varying movable elements of a microscope objective and, therefore, a simple, cost-efficient, user-friendly, and precise compensation, particularly, of cover glass fluctuations and varying bottom thicknesses of Petri dishes for improving the imaging quality.

For solving said task, the invention suggests a controller for movable elements in microscope objectives with which at least two movable elements of a microscope objective, designed as mounted lenses or lens groups, which are motor-driven in axial direction via respectively assigned adjusting rings along the optical axis of the microscope objective and are movable relative to the housing of the microscope objective. Thereby, in one embodiment a transmitting of the rotary movement of motors adjusting rings is advantageously effected by gear units, whereby a control unit, externally controlled and positioned within the microscope objective, for storing various characteristics for travel paths of the movable elements is provided.

An example embodiment is designed in such a way that the individual adjusting rings are separately movable by means of motors, assigned to the individual adjusting rings respectively, or that the adjustment of two or more movable elements along the optical axis of the microscope objective is coupled in such a way that, for example, two adjusting rings are partially or completely coupled and rotationally movable via a motor, or that all adjusting rings are coupled with each other and movable along the optical axis of the microscope objective, allowing therefore for simultaneous focusing.

A further advantage of the motorized control is the free configuration of the characteristics for travel paths for each motor, which, e.g., can be designed as positioning drive.

For example, each movable element can be positioned axially by an adjusting ring and a motor. The individual motors can be controlled in such a way that the movable element to be controlled travels along an axial, linear path and/or an axial curved path. During the axial movement of a movable element on a curved path, the individual path points are defined for the positioning drive and stored in the internal control unit. Therefore, with a thread adjustment, which effects a linear movement of the movable elements, via the stored characteristic for the positioning motor, it is possible to design the control of the motor in such a way that the rotational speed of the motor, controlled with the stored characteristic, results in an axial movement of the movable element on a curved path.

In an example embodiment, the characteristics for the travel paths of the movable elements of the microscope objective are stored in the internal control unit, whereby correcting of the imaging quality and focusing can be executed in accordance with the various characteristics for travel paths. As a result, every microscope objective can be switched on the stand, allowing for the use of a multiple turret or a switch of objectives during the measuring process. Furthermore, the storage of the characteristics for travel paths of the movable elements of every microscope objective in the internal control unit prevents collisions of the starting and end points of the travel paths of the individual movable elements, which vary due to mechanically caused tolerances.

In another example embodiment, the internal control unit receives its control commands from an external control unit which is positioned either in the microscope or a stationary control unit, allowing for an automated observation of samples while taking into account a continuously corrected imaging quality.

With the controller, according to the invention, the mechanical advantages of the thread adjustment can be used in such a way that in addition to the heretofore executed linear movements of the movable elements, said movable elements can also be moved along programmable curved paths, allowing for increased degrees of freedom for the layout of the optical design of a objective, which, among others, allow for a more cost-efficient construction of the design.

A further advantage of utilizing the controller is the option of focusing into the sample (internal focusing) while maintaining the image quality through appropriate adjustment of the movable elements. This is particularly significant for focusing with a microscope objective through a cover glass or the bottom of a Petri dish into an aqueous solution since the correcting and focusing position of the microscope objective must be adjusted due to the dispersion of light in water. As a result, the application of a microscope objective is further expanded. Until now it has only been possible to adjust the spherically corrected focal point of a microscope objective for varying cover glass thicknesses and/or immersion media directly at the cover glass or bottom of a Petri dish.

By means of the new controller for the movable elements it is also possible to now include in the calculations for the optical design additional values for the new positions of the movable elements for focusing in the sample, i.e., away from the cover glass or the bottom of a Petri dish. Additionally, said values are also stored in the internal control unit of the microscope objective. Therefore, with a microscope objective, the focus can be changed in such a way that a new focal point within the sample (internal focusing) can be mapped while maintaining imaging quality.

BRIEF DESCRIPTION OF THE DRAWINGS

In the following, the invention is further explained by means of drawings with schematically shown embodiments.

DETAILED DESCRIPTION

Figure 1:
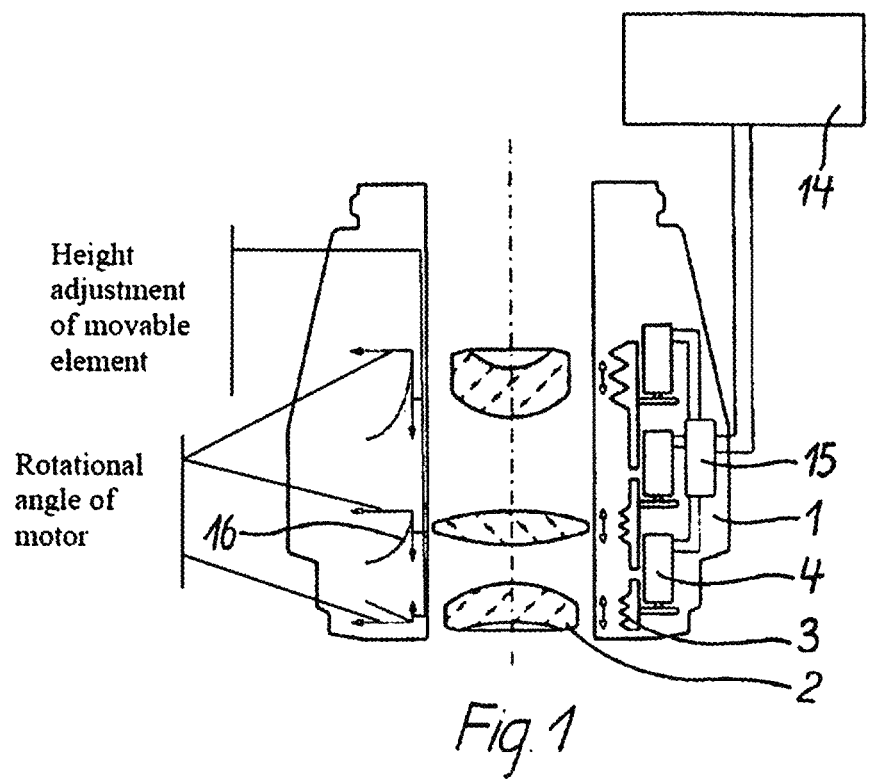
FIG. 1 depicts a first embodiment of a controller, according to the invention.

FIG. 1 depicts the cutaway view of a first embodiment of the controller, according to the invention, for a microscope objective 1. In order to adjust hard-to-reach microscope objectives 1 easily for the best imaging quality, it is advantageous if, for example, at least two movable elements 2 of the microscope objective 1, including mounted lenses or lens groups which are controllable through respective motors 4, are movable in axial direction via respectively assigned adjusting rings 3 along the optical axis of the microscope objective 1. Positioning drives, piezo motors, or ultrasonic motors can also be utilized as drives.

In the embodiment in accordance with FIG. 1, every movable element 2 is positioned via an adjusting ring 3 rotationally driven, by means of a motor 4, respectively. Thereby, the individual motors 4 can be controlled in such a way that the respective controlled movable element 2 travels on an axial, linear path and/or an axial curved path.

During the axial movement of a movable element 2 on a curved path, the individual path points are defined for the positioning drive and stored in the internal control unit 15, so that with a thread adjustment, which effects a linear movement of the movable elements 2, via the stored characteristic for the motor 4, it is possible to design the control of the motor 4 in such a way that the rotational speed of the motor 4, controlled with the stored characteristic, results in an axial movement of the movable element 2 on a curved path. This results in variation of axial movement relative to rotational movement.

Figure 2:
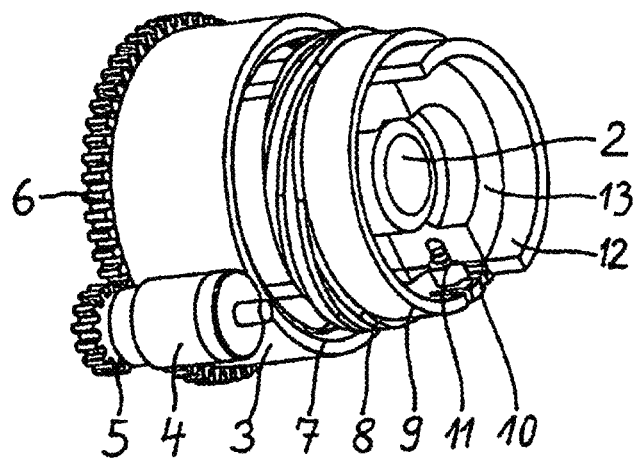
FIG. 2 depicts a movable element as isometric representation.
Figure 4:
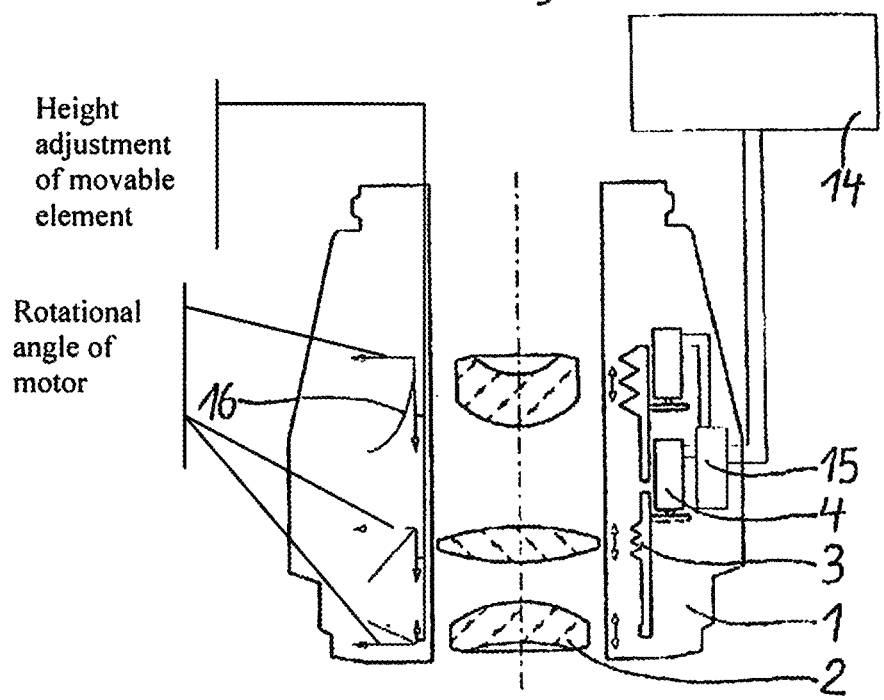
FIG. 4 depicts a second embodiment of the controller, according to the invention.

According to FIG. 4, the adjusting rings 3 are partially coupled in a second embodiment via the motors 4 or completely coupled and rotationally moved through a motor 4 in another embodiment. The transmitting of the rotary movement of the motors 4 onto the movable elements 2 is advantageously effected via a gear unit, either via a gear train (see FIG. 2) or a tooth belt drive. The motor 4 drives the adjusting ring 3 via a pinion 5 and a sprocket 6. Via a spring package, not shown herein, the adjusting ring 3 is pressed against a fixed structure and can therefore only be moved rotationally. Internally, the adjusting ring 3 exhibits an internal thread 7; the internal thread 7 engages in an external thread 8 of an inner bushing 9, wherein a lug 10 is positioned. Said lug 10 is led via an elongated hole 11 into a fixed bushing 12 and is connected with the bushing for the lens holder 13. The bushing for the lens holder 13 with the lens positioned inside results in the movable element 2. The lug 10 in the elongated hole 11 of the fixed bushing 12 prevents the rotation of the inner bushing 9 and therefore the movable element 2 since the lug 10 can only move axially in the elongated hole 11 of the fixed bushing 12. Thus the rotational movement of the adjusting ring 3 is converted via the lug 10 to an axial movement of the movable element 2.

Figure 3:
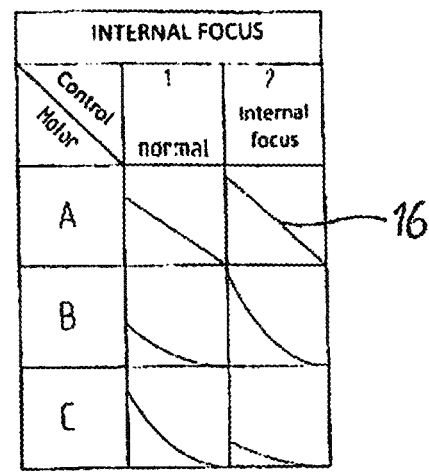
FIG. 3 depicts characteristics for travel paths of movable elements.

Due to the rotational movement of the motors 4, the movable elements 2, designed to include lenses or lens groups, are moved along the optical axis of the microscope objective 1, whereby simultaneous focusing is possible. According to FIG. 3, characteristics for the travel paths 16 of the movable elements 2 are stored in the internal control unit 15. Thereby, the characteristic in column 1, row A, corresponds to an axial, linear path of the movable element 2, while, e.g., the characteristic in column 1, row C, reflects an axial curved path of the movable element 2.

The height adjustment of the movable element 2, effected by said movable element 2, designed as lenses or lens groups, in dependence of the rotation angle of the motor 4 is shown in diagrams.

Depending on the correction mode, the movable elements 2 are moved in accordance with varying characteristics, e.g., column 1=correction mode, column 2=focusing mode. As a result, every microscope objective 1 can be switched on the stand, allowing for the use of a multiple turret or a switch of microscope objectives 1. Since the characteristics and their references for the travel paths 16 of the movable elements 2 of the microscope objective 1 are stored in the internal control unit 15, the starting and end points, which vary due to mechanically caused tolerances, of the travel paths of the individual movable elements 2 can also be stored and no collisions occur. The internal control unit 15 receives its control commands from an external control unit 14, which can be positioned either in the microscope or in a stationary control unit.

The invention is not restricted to the embodiments but manifoldly variable within the scope of the disclosure.

LEGEND

1 Microscope objective
2 Movable element
3 Adjusting ring
4 Motor
5 Pinion
6 Sprocket
7 Internal thread
8 External thread
9 Inner bushing
10 Lug
11 Elongated hole
12 Fixed bushing
13 Bushing for lens holder
14 External control unit
15 Internal control unit
16 Characteristic for travel paths

The invention claimed is:

1. A controller that controls an interchangeable microscope objective to adjust hard-to-reach microscope objective lenses to correct imaging quality and store adjustment movements, the controller comprising:
   at least two independently movable optical elements of the interchangeable microscope objective, comprising mounted lenses or lens groups, each of the independently movable optical elements being motor-driven by a motor or motors in an axial direction via respectively assigned adjusting rings that are operably coupled between the motors and the independently movable optical elements, the axial direction being along an optical axis of the microscope objective the at least two movable elements being independently movable according to stored path points relative to a housing of the interchangeable microscope objective and relative to each other by independent operation of the motors operably coupled to the adjusting rings and to each movable element whereby correction of imaging quality is achieved; and
   an internal control unit that is externally controlled by an external control unit located outside the objective and the internal control unit being positioned integrally within the interchangeable microscope objective and operably coupled to the motors of each of the at least two independently movable optical elements, the internal control unit storing in a memory, also positioned integrally within the interchangeable microscope objective, varying characteristics for travel paths of each of the independently movable optical elements, the varying characteristics including the individual path points and being such that the each of the motors is actuated to cause each of the movable elements to travel on an axial linear path or an axial curved path wherein movement of the at least two independently movable optical elements is controlled to achieve focusing as well as image quality correction.

2. The controller, according to claim 1, further comprising gear units that transmit rotary movement of the motors to the adjusting rings.

3. The controller, according to claim 1, wherein the adjusting rings are separately movable by the motors assigned to the adjusting rings.

4. The controller, according to claim 1, wherein control of adjustment movements of two or more of the independently movable optical, elements along the optical axis of the microscope objective are coupled such that the adjustment movements of two of the adjusting rings are partially or completely coupled and rotationally movable via the motors.

5. The controller, according to claim 1, wherein control of the adjustment movements of all of the adjusting rings are coupled with each other and are movable by the motors around the optical axis of the microscope objective.

6. The controller, according to claim 1, wherein characteristics for travel paths of the movable elements of the microscope objective can be freely configured for every motor of the motors.

7. The controller, according claim 2, wherein characteristics for the travel paths of the movable elements are stored in the control unit positioned within the microscope objective, and wherein correcting of the imaging quality and focusing is executed in accordance with the characteristics.

8. The controller, according to claim 2, wherein starting and end points of the travel paths of individual movable elements, which vary due to mechanically caused tolerances, are stored in the control unit within the objective.

9. The controller, according to claim 2, wherein the external control unit is positioned either in the microscope or in a stationary control unit.

10. A controller that controls independently movable optical elements in an interchangeable microscope objective for adjustment of a hard-to-reach microscope objective for correcting imaging quality and storing adjustment movements of the movable elements, comprising:
   at least two of the independently movable optical elements located in the microscope objective that support mounted lenses or lens groups, each independently movable element being operably coupled to a motor that drives the independently movable optical element and moves the mounted lenses or lens groups in an axial direction relative to a housing of the objective, each independently movable optical element comprising an adjusting ring operably coupled between the motors and the independently movable optical elements that converts rotary motion of the motor into axial motion of the mounted lenses or lens groups, the at least two movable elements being independently movable according to stored path points relative to a housing of the interchangeable microscope objective and relative to each other by independent operation of the motors operably coupled to the adjusting rings and to each movable element whereby correction of imaging quality is achieved;

wherein the objective further comprises an internal control unit located integrally within the interchangeable microscope objective and being controlled by an external control unit located outside the objective;

wherein the internal control unit stores in a memory, also positioned integrally within the interchangeable microscope objective, path points for varying characteristics for travel paths for each of the independently movable optical elements, the varying characteristics being such that the independently movable optical elements each travel on an axial linear path or on an axial curved path wherein movement of the at least two independently movable optical elements is controlled to achieve focusing as well as image quality correction.

11. The controller according to claim 10, wherein each movable element further comprises a gear unit that transmits rotary movement of the motors to the adjusting rings.

12. The controller, according to claim 10, wherein the adjusting rings are each separately movable by the motor operably coupled thereto.

13. The controller, according to claim 10, wherein control of each of the adjusting rings is operably coupled to a respective motor of the motors such that adjustment movement of at least two of the adjusting rings are partially or completely coupled.

14. The controller, according to claim 10, wherein control of all of the adjusting rings is coupled and each of the adjustment rings are movable by the motors around the optical axis of the microscope objective.

15. The controller, according to claim 10, wherein the internal control unit within the objective that stores varying characteristics for travel paths of the movable elements can be freely configured for each motor.

16. The controller, according claim 15, wherein the stored characteristics for travel paths include characteristics to correct image quality and to focus the objective.

17. The controller, according claim 15, wherein the stored characteristics for travel paths include end points of the travel paths of individual movable elements, which vary due to mechanical tolerances.

18. The controller, according to claim 10, further comprising an external control unit operably coupled to the internal control unit, the external control unit being located in the microscope or in a stationary control unit.

19. The controller, according to claim 10, wherein the external control unit operably coupled to the internal control unit is programmed to perform automated observation of samples while continuously correcting image quality.

* * * * *